United States Patent

Paice

[11] 4,220,896
[45] Sep. 2, 1980

[54] HIGH FREQUENCY LIGHTING INVERTER WITH CONSTANT POWER BALLAST

[75] Inventor: Derek A. Paice, Murrysville, Pa.

[73] Assignee: The United States of America as represented by the Secretary of the Interior, Washington, D.C.

[21] Appl. No.: 934,151

[22] Filed: Aug. 16, 1978

[51] Int. Cl.² .................. H05B 41/29; H05B 41/392
[52] U.S. Cl. ............................... 315/205; 315/206; 315/223; 315/307; 315/DIG. 7
[58] Field of Search ............................. 315/205–208, 315/209 R, 219, 223, 226, 291, 307

[56] References Cited

U.S. PATENT DOCUMENTS

| | | | |
|---|---|---|---|
| 3,611,021 | 10/1971 | Wallace | 315/239 |
| 4,053,813 | 10/1977 | Kornrumpf et al. | 315/209 R X |

*Primary Examiner*—Alfred E. Smith
*Assistant Examiner*—Charles F. Roberts
*Attorney, Agent, or Firm*—Thomas Zack; Donald A. Gardiner

[57] ABSTRACT

A lighting inverter for operating an electrical discharge lamp from a direct current power source. The inverter includes a resonant feedback inverter which converts the output of the d.c. power source to an alternating current output and regulates the a.c. inverter output voltage level by varying the frequency thereof. A ballast filter is coupled to the regulated output of the resonant feedback inverter and is formed by a series circuit of a ballast inductor and a ballast capacitor. Connected across the capacitor is the discharge lamp. Appropriate circuit parameters such as ballast inductance, ballast capacitance, inverter operating frequency, and the inverter resonant frequency are selected to maintain almost unity power factor at the input to the ballast filter.

7 Claims, 5 Drawing Figures

HIGH FREQUENCY LIGHTING INVERTER WITH CONSTANT POWER BALLAST

BACKGROUND OF THE INVENTION

1. Field of the Invention

This invention relates to a high efficiency, high frequency lighting inverter, and more particularly to a regulated variable frequency inverter having an output filter ballast to operate non-linear loads, such as mercury vapor lamps.

2. Description of the Prior Art

In the prior art, the high frequency power supplies used to operate discharge lamps and other non-linear loads from a D.C. power source such as a coal mine D.C. trolley have suffered from the disadvantage of operating over a wide range of input voltages, for example, 200 to 350 vdc. In order to acommodate these variations in input voltage, an inverter system of the type described by Neville Mapham, "An SCR inverter with good regulation and sine-wave output" IEEE transactions on Industry and General Applications, March/April 1967, IGA-2, No. 2, pages 176–187 which provides a frequency dependent output voltage, has been used in conjunction with loads using a capacitor ballast, such as shown in FIG. 1.

The circuit of FIG. 1 obtains regulation of the load voltage by varying the inverter frequency, and a very satisfactory nearly constant output is obtained by keeping the product of voltage and frequency constant. However, due to the low power factor of the capacitor ballast scheme, the inverter and output transformer kVA rating is substantially greater than the required power output, and is typically 2.5 times greater

SUMMARY OF THE INVENTION

Accordingly, one object of this invention is to provide a novel lighting inverter which exhibits high efficiency, and improved load power factor.

Another object of this invention is to provide a novel lighting inverter having about half the kVA output rating of inverters used in the prior art.

A further object of this invention is to provide a novel lightweight and physically small lighting inverter.

Yet another object of this invention is to provide a novel lighting inverter having an improved output filter ballast.

These and other objects of this invention are achieved by employing a resonant feedback inverter, which has an output voltage varying with the switching frequency of the inverter, to drive a ballast filter which includes an inductor in series circuit with a ballast capacitor which is connected across the non-linear load represented by a discharge lamp. Circuit parameters such as operating frequency, the inductance of the ballast inductor, the capacitance of the ballast capacitor, and the average value of resistance of the non-linear load are selected with a predetermined relationship such that unity power factor occurs at the input to the ballast filter, whereby a substantial reduction in inverter power capability is realized, with a consequent reduction in inverter weight and size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
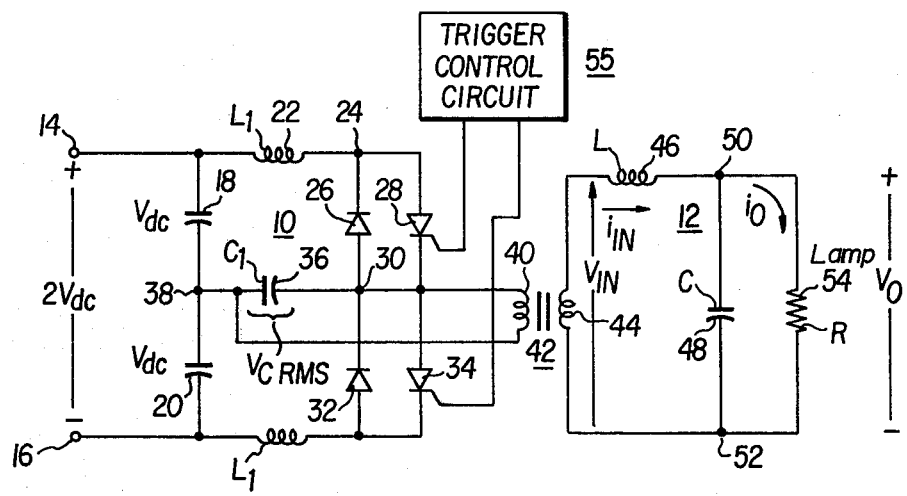
FIG. 2 is a circuit diagram of the high efficiency, high frequency lighting inverter with constant power factor ballast of the invention.

Referring now to the drawings, wherein like reference numerals designate identical or corresponding parts throughout the several views, and more particularly to FIG. 2 thereof, the resonant feedback inverter 10 employed to drive the ballast filter 12 is seen to have a D.C. voltage, 2 Vdc, applied to the input terminals 14 and 16 thereof. As a result, a D.C. voltage of Vdc is maintained across each of the filter capacitors 18 and 20 which are connected in series across the input terminals 14 and 16 as shown in FIG. 2. Also connected to the input terminal 14 is one side of the inductor 22, the other side of the inductor 22 connected at the junction 24 to the cathode of diode 26 and the anode of SCR 28. The anode of diode 26 and the cathode of SCR 28 are connected at the junction 30 to the cathode of diode 32 and the anode of SCR 34. Also connected to the junction 30 is one side of the capacitor 36 which has the opposite side thereof connected at the junction 38 to the series connection of capacitors 18 and 20. Connected across the junction 30 and 38 in parallel to the capacitor 36 is the primary 40 of transformer 42. In series connection with the secondary 44 of the transformer 42 is the inductor 46 and the capacitor 48 which together form the ballast filter 12 of the invention. Connected across the terminal 50 and 52 in parallel with the capacitor 48 is the load 54 which is represented by the average resistance of the non-linear discharge lamp. A control circuit 55, of conventional design, is shown in FIG. 2 as having a pair of trigger outputs connected to the gate terminals of the SCR's 28 and 34.

When the SCR 28 is triggered by the control circuit 55, current flows from the supply capacitor 18 charging up the load capacitor 36 to a voltage approaching twice the voltage across supply capacitor 18. This current then reverses and flows back to the supply capacitor 18 via the diode 26 and capacitor 36 thereby discharges. During the reverse current flow, turn-off time is presented to the SCR 28. The SCR 34 is triggered next and a similar cycle occurs in the lower half of the circuit with a negative going pulse of voltage appearing across the capacitor 36. Thereafter the SCR 28 is again triggered and so the cycles repeat. By controlling the frequency of the firing of the SCR's 28 and 34, it is possible to regulate the load voltage appearing across the capacitor 36 and therefore across the secondary 44 of the transformer 42, which serves as the input voltage to the ballast filter 12 of the invention. Thus, regulation of the load voltage applied to the discharge lamp is obtained by varying the inverter frequency, and a very satisfactory nearly constant load output voltage is obtained by maintaining the product of the input voltage to the inverter and the inverter frequency constant.

Figure 4:
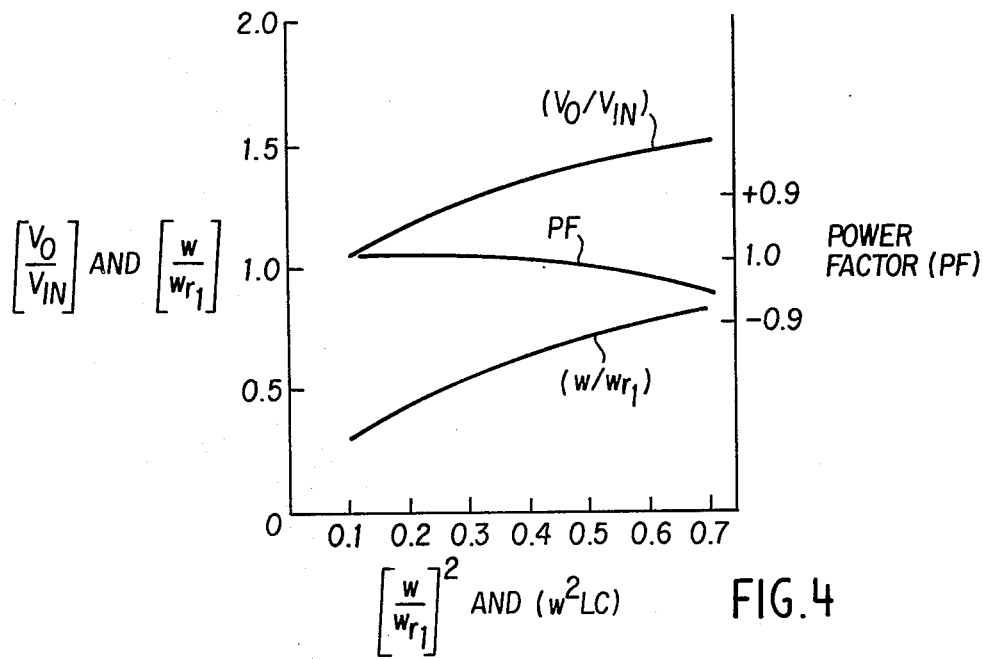
FIG. 4 is a performance curve showing constant power factor ballast with varying frequency, ballast filter input/output voltage versus selected values of circuit parameters, and ballast filter frequency versus selected parameter values.

According to the invention, the ballast circuit 12 driven by the resonant feedback inverter 10 is defined in terms of the appropriate transfer functions as now presented:

$$\frac{V_o}{V_{in}} = \frac{1}{(1 - \omega^2 LC) + j\omega L/R} \quad (1)$$

$$i_{in} = \frac{V_{in}}{j\omega L} \cdot \frac{[1 + j\omega^2 LC/(\omega L/R)]}{[1 + j(\omega^2 LC - 1)/(\omega L/R)]} \quad (2)$$

$$w_{r1} = 1/\sqrt{LC} \quad (3)$$

wherein:
$V_o$ = voltage output f(jω) across the load R
$V_{in}$ = voltage f(jω) input to the ballast filter 12 across the secondary 44 of transformer 42
$\omega_{r1}$ = ballast filter resonant frequency
L = inductance of ballast inductor 46
C = capacitance of ballast capacitor 48
R = average resistance of non-linear load.
$i_{in}$ = current f(jω) through the secondary 44 of transformer 42
ω = nominal inverter operating frequency
$\omega_{r2}$ = inverter resonant frequency It is noted that in a practical case the load may be highly non-linear, however it does have an average value of resistance R which can be used in the calculation of the transfer function. If the circuit constants are chosen such that $\omega^2 LC=0.5$ and $\omega L/R=0.5$, then unity power factor occurs at the input. This factor is shown in FIG. 4, as are other characteristics for other frequencies. FIG. 4 shows that an excellent power factor over about a range of 2 to 1 in frequency is realized using the circuit shown in FIG. 2. Also, the load voltage $V_o$ can be varied from 1.1 to 1.41 as the (frequency)² varies from 0.25 to 0.5. Thus, the ballast filter 12 is suitable for voltage control by frequency control and provides an excellent power factor.

Figure 1:
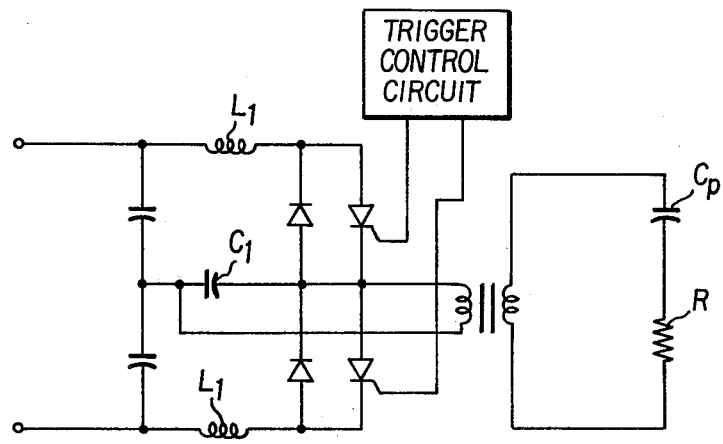
FIG. 1 is a circuit diagram of a lighting inverter of the prior art.
Figure 3:
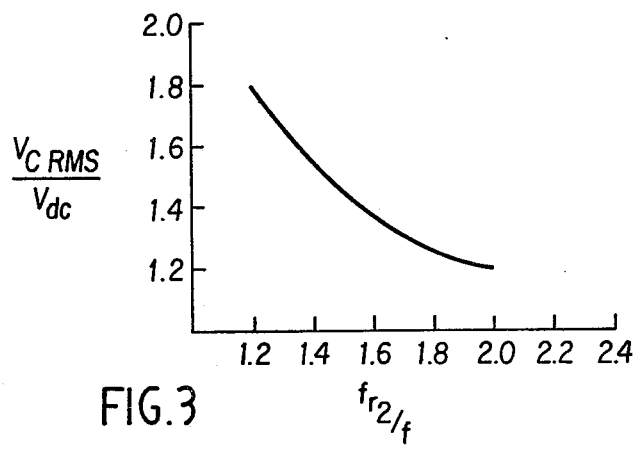
FIG. 3 is a performance curve illustrating the voltage output of the inverter of FIG. 2 with varying frequency.

As stated above, the resonant feedback inverter shown in FIGS. 1 and 2 has an output voltage applied to the primary 40 of the transformer 42 which varies with the inverter frequency; that is, the output voltage is increased as the frequency is increased. The actual proportionality is dependent upon the details of the inverter design, however, the sense is such as to match the new output filter and load. For example, if the inverter D.C. input voltage increases, then a reduction in operating frequency causes the output of the inverter 10 across the transformer 42 to decrease, and likewise, the load output $V_o$ for the ballast filter 12 to the non-linear load as represented by R. The inverter output voltage across the primary 40 of the transformer 42 versus inverter frequency for a typical inverter design is shown in FIG. 3. The data shown therein can be used in an initial design evaluation, and additional similar data is also given in the Mapham article referenced above.

As an example of the high efficiency-high frequency lighting inverter of the invention, the data of FIGS. 3 and 4 are now utilized to derive the basic design of a lighting inverter which operates at full power from a D.C. input voltage varying between 350 to 240 volts. Assuming an output load of 125 volts at 12 amperes to the non-linear discharge lamps, it is seen that 1500 watts of power is dissipated therein. The pertinent selected filter parameters are $\omega^2 LC=0.5$, and $\omega L/R=0.5$ at the lowest input voltage of 240 volts D.C. across the input terminals 14 and 16 of the inverter 10. From FIG. 3, the inverter characteristics are selected; typically, a minimum frequency ratio $f_{r2}/f$ of 1.3 gives excellent turn-off times for the SCR switching elements 28 and 34. At this frequency ratio, and assuming a voltage Vdc of 120 volts D.C. across each of the supply capacitors 18 and 20, the A.C. output voltage $V_c$ across the primary 40 of the transformer 42 is seen to be in the vicinity of 196.8 volts rms. From FIG. 4, it is seen that at $\omega^2 LC=0.5$, the output of the ballast filter across the load resistor 54 is 1.41 times the A.C. input voltage to the filter. With an output voltage as assumed above of 125 volts rms across the load resistance R54, it is seen that an input voltage across the secondary 44 of the transformer 42 of 88.4 volts rms is required to produce an output of 125 volts rms across the load resistor 54. Thus, the ratio of the voltages across the primary and the secondary of the transformer 42 is 196.8/88.4. Therefore, transformer 42 is designed with a turns ratio $n_1/n_2$ of 2.22:1, where $n_1$ and $n_2$ indicate the relative number of turns of the windings which comprise the primary 40 and the secondary 44 respectively of the transformer 42 in order to match the inverter output voltage $V_c$ to the input voltage $V_n$ of the ballast filter 12 of the example.

Other calculated performance figures for the postulated design stated above are now given in Table 1 as shown below.

TABLE 1

CALCULATED PERFORMANCE OF VARIABLE FREQUENCY INVERTER WITH CONSTANT POWER FACTOR LOAD.

Operating and Design Parameters
$\omega^2$ LC = 0.5 at 2400 Hz, $\omega L/R$ = 0.5 at 2400 Hz, Ballast natural resonance frequency
$f_{r1}$ = 3395 Hz
Inverter natural resonance frequency $f_{r2}$ = 3120 Hz
L = 0.345 mH, C = 6.37 μF, R = 10.416 Ω

| w²LC | V dc | Frequency | $f_{r2}/f$ | $V_c$/V dc | Inverter Output Volts | Amps. | Resistive Load Volts | Amps | Total Load P.F. |
|---|---|---|---|---|---|---|---|---|---|
| 0.5 | 200 | 2400 | 1.3 | 1.64 | 73.6 | 14.1 | 104 | 9.98 | 1.0 |
| 0.5 | 240 | 2400 | 1.3 | 1.64 | 88.4 | 16.9 | 125 | 12.0 | 1.0 |
| 0.347 | 305 | 2000 | 1.56 | 1.4 | 96.1 | 15.7 | 125 | 12.0 | 0.99 |
| 0.28 | 341 | 1800 | 1.73 | 1.3 | 100.0 | 15.2 | 125 | 12.0 | 0.985 |
| 0.222 | 392 | 1600 | 1.95 | 1.2 | 106.0 | 14.42 | 125 | 12.0 | 0.98 |

Referring to Table 1, it is noted that this table is based on a load output power of 1500 watts with a total inverter output rating of approximately 1540 watts. The overall performance of the high frequency lighting inverter of the invention has been observed to vary satisfactorily over the required operating range, and although some reduction of power occurs at an input voltage 2 $V_{dc}$ of 200 volts d.c. at the input of the inverter 10, operation at this level has been found to be feasible. This is especially true for lamp loads because the high output impedance of the filter operates favorably in conjunction with non-linear lamp resistance characteristics to increase the power output at low d.c. input voltages. More constant output voltage can of course be obtained by selecting a different constraint for the lowest input voltage. However, the design example is a reasonable compromise.

Figure 5:
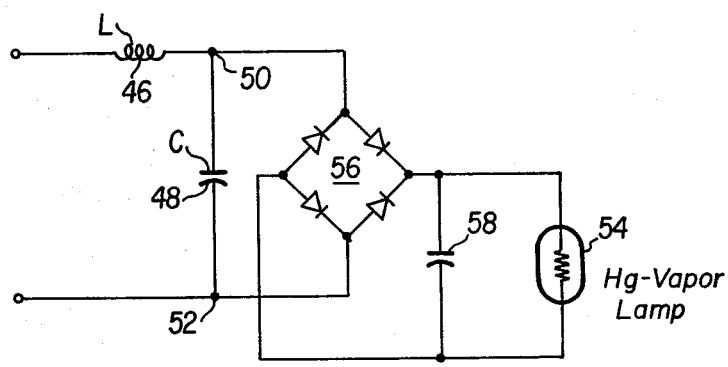
FIG. 5 is a circuit diagram of a constant power factor ballast filter which includes rectification and additional filtering to supply various d.c. lamp loads.

For lamps where acoustical resonance can occur, such as with some mercury vapor type lamps, it is sometimes necessary to apply a d.c. load voltage. As shown in FIG. 5, a d.c. load voltage is obtained by connecting a rectifier 56 across the junctions 50 and 52 of the ballast capacitor 48, and by adding a filtering capacitor 58 across the output of the rectifier 56 and in parallel with the load 54, as shown in FIG. 5.

As seen from the above discussion, the present invention advantageously provides a simple control mechanism based on the frequency control techniques inherent in the resonant feedback inverter circuit. By combining the resonant feedback inverter circuit 10 with the ballast filter 12 of the invention, substantial reduction in inverter power ratings are achieved, on the order of 50%, with consequent weight and size reductions. Also, the high efficiency, high frequency lighting inverter of the invention enables automatic quick starting due to voltage magnification and the high voltages developed across the lamps not struck. Thus, it is seen that when the circuit parameters are selected to give $\omega^2 LC = 0.5$, a virtually constant power and unity power factor is applied to the ballast filter 12 regardless of inverter frequency variation. On the other hand, the ballast filter 12 is also viable as a ballast means if the input supply voltage to the inverter 10 and the inverter frequency are fixed. In that case the lighting inverter of the invention automatically compensates for lamp impedance changes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lighting inverter for operating an electric discharge lamp from a direct current (d.c.) power source, comprising:
inverter means for converting the output of said d.c. power source to an alternating current (a.c.) output having an operating frequency $\omega$ and for regulating the output voltage level of said a.c. output by varying the value of $\omega$ thereof;
a ballast filter coupling the regulated output voltage of said inverter means to said electric discharge lamp, said ballast filter comprising a ballast inductor having an inductance value L in series circuit with a ballast capacitor having a capacitance value C, such that the relationship $\omega^2 LC = 0.5$ is effectively satisfied as there is supplied voltage across said ballast capacitor which is directed to said discharge lamp.

2. A lighting inverter according to claim 1, wherein the discharge lamp has an average value of resistance "R," and wherein the additional following relationship is also effectively satisfied:

$$\omega L/R = 0.5$$

3. A lighting inverter according to claim 1, wherein said inverter means comprises:
a pair of input terminals connected to said d.c. power source;
a pair of supply capacitors connected in series circuit at a first junction,
the series circuit of said supply capacitors connected to said input terminals in parallel circuit with said d.c. power supply;
a load capacitor having two terminals, one of said load capacitor terminals connected to said first junction;
a pair of inductors each having two terminals, one terminal of each inductor respectively connected to one of said input terminals;
a pair of switching circuits respectively connected between the other terminals of said inductors and the other terminal of said load capacitor, each of said switching circuits comprising a thyristor and a diode connected in parallel circuit with the anode of each thyristor connected to the cathode of each diode and the cathode of each thyristor connected to the anode of each diode, said switching circuits connected such that the anode of the diode and the cathode the thyristor of one switching circuit is connected at a second junction to the cathode of the diode and the anode of the thyristor of the other switching circuit, the other terminal of said load capacitor also connected to said second junction.

4. A lighting inverter according to claim 3, wherein each of the inductors of said inverter means has an inductance "$L_1$," the load capacitor has a capacitance "$C_1$," and the thyristors are switched at a frequency "f," and wherein the following relationship is satisfied:

$$f = \frac{1}{(2\pi)(1.3\sqrt{L_1 C_1}\,)}$$

5. A lighting inverter according to claim 3, wherein said inverter means further comprises:
a transformer having a primary winding connected across said first and said second junctions, and a secondary winding connected in parallel circuit with the series circuit of said ballast inductor and said ballast capacitor.

6. A lighting invertor according to claim 1, wherein said ballast filter further comprises:
a rectifier circuit having a pair of input terminals connected in parallel circuit with said ballast capacitor and a pair of output terminals; and,
a filtering capacitor connected in parallel circuit with the output terminals of said rectifier circuit, said discharge lamp connected to said filtering capacitor.

7. A lighting inverter for operating an electric discharge lamp from a direct current (d.c.) power source, comprising:
inverter means for converting the output of said d.c. power source to an alternating current (a.c.) output and for regulating the output voltage level of said a.c. output by varying the frequency thereof;

a ballast filter coupling the regulated output of said inverter means to said electric discharge lamp, said ballast filter comprising a ballast inductor in series circuit with a ballast capacitor, such that the voltage across said ballast capacitor is directed to said discharge lamp, said filter also comprising a rectifier circuit having a pair of input terminals connected in parallel circuit with said ballast capacitor and a pair of output terminals; and, a filtering capacitor connected in parallel circuit with the output terminals of said rectifier circuit, said discharge lamp being connected to said filtering capacitor.

* * * * *